Jan. 13, 1970  L. MAZZA  3,490,060
APPARATUS FOR ADJUSTING THE FALL-DOWN SPEED OF A PAWL
FOR ADVANCING A RATCHET WHEEL, PREFERABLY USED
FOR TIMING DEVICES AND THE LIKE
Filed July 11, 1968
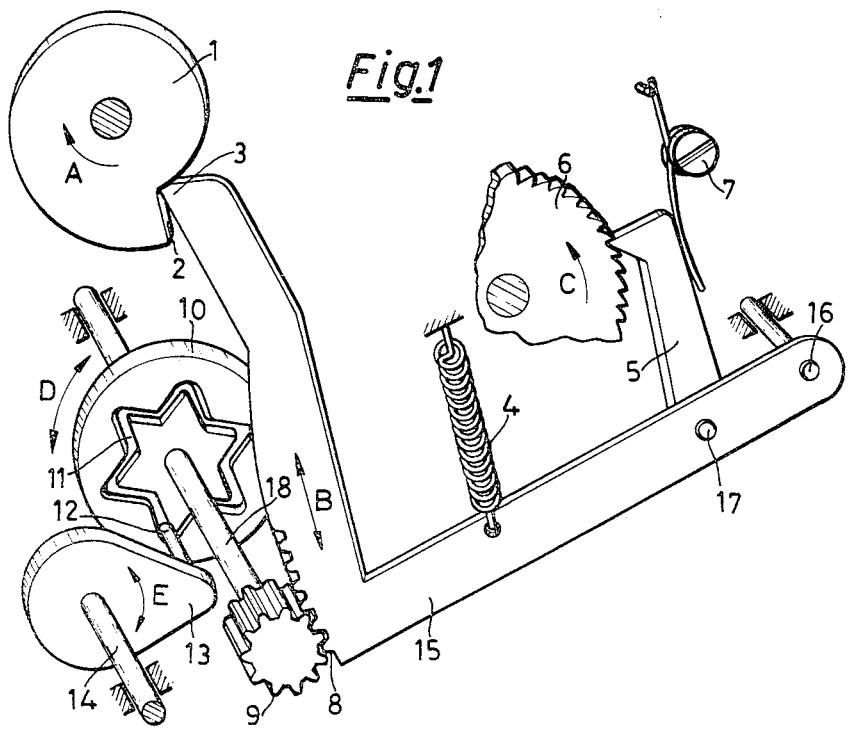
*Fig.1*
*Fig.2*
INVENTOR
BY *Glascock, Downing + Seebold*
ATTORNEYS

3,490,060
APPARATUS FOR ADJUSTING THE FALL-DOWN SPEED OF A PAWL FOR ADVANCING A RATCHET WHEEL, PREFERABLY USED FOR TIMING DEVICES AND THE LIKE

Lamberto Mazza, Pordenone, Italy, assignor to Industrie A. Zanussi S.p.A., Pordenone, Italy, a company of Italy
Filed July 11, 1968, Ser. No. 744,016
Claims priority, application Italy, July 14, 1967, 18,417/67
Int. Cl. F16h *25/16, 27/02*
U.S. Cl. 74—142                             2 Claims

ABSTRACT OF THE DISCLOSURE

A device for adjusting the dropping speed of a pawl used for causing a toothed wheel to advance, especially in timing devices and the like, wherein the motion of said pawl is transferred to a rotatable body equipped with a star-shaped cavity engaged by a pin integral with a rotatable mass. The outline of said star-shaped cavity is such as to impart an alternate rotation to said rotatable mass. The frequency of an oscillating mass is exploited to adjust the dropping speed of the pawl.

---

This invention relates to a device for adjusting the falling-down speed of a pawl for advancing a ratchet-wheel, preferably used for timing devices and the like.

The problem of braking the thrust of the pawl-arm on the teeth of the ring gear with which it comes into engagement, in the particular case of an advance with quick snaps, is posed whenever it is not possible, or it is not desired, to put stops to the advance of the disc which carries said ring gear, that is in the case in which, due to an exceedingly abrupt thrust of the pawl, the ring gear may continue to go on beyond the pawl stroke proper. This happens when the device is also provided for the manual advance of the toothed gear, in addition to the actuation by the pawl, which is controlled by a motorized reducing gear by means of a cam and a lever and spring system. The movements of the pawl on the ring gear are guided by a cam having an appropriate cam profile, which contemplates a step. The rotation of the cam, which takes place by contact with a pin which engages the cam on sectors of ever increasing radius, causes a rotation of the pawl arm and the latter goes back by sliding on the teeth of the gear. When the cam offers the stepped portion, the pin, which is urged against the cam by a spring, snaps and this snapping motion is transferred by a leverage, as aforesaid, to the pawl. The latter, urged in turn against the toothed wheel by a spring, also on account of the particular shape of the teeth, also snaps forward, thus causing the toothed wheel to advance. If the toothed wheel is free to advance, it may occur that the thrust imparted thereto by the pawl is such as to cause the wheel to advance in spite of possible frictional systems and also in spite of the friction of the pawl. The latter, having completed its forward stroke, would now go back with respect to the toothed wheel. If it is desired to do away with said drawback, that is, whenever it is desired to confine the advance strokes of the toothed wheel to what had been calculated when designing both the cam and the pawl and inasmuch as too long advance times are undesirable, the more so that cams with smoother variations and without stepped portions cannot be adopted as quite particular operative requirements demand an almost instantaneous transition between a condition and the next, it has been suggested, at the outset, to reduce the height of the stepped portion. This method, however, implies, obviously, a lesser variation of the cam radius and thus, in order that an equal reverse stroke of the pawl on the ring gear, a linkage is necessary for transferring the drive and this involves an increase of the stresses of the cam. Since cams are generally made of a plastic material or the like, stresses may become exceedingly high, more particular after many hours of operation. Another expedient has been that of properly calibrating the spring which urges the pawl arm against the ring gear. The calibration tolerance, however, is too close. This fact implies a costly constructional accuracy and, in addition, after long periods of operation the resiliency of the spring changes and the calibration is destroyed.

An object of the invention is to provide a device for adjusting the fall-down speed of a pawl for the advance of a toothed wheel, preferably used on timing devices and the like, said pawl being controlled by a cam, said device being characterized in that means are provided for transferring the pawl motion to a rotatable body which carries a cavity in which a pin is received which is integral with a mass rotatable about an axle, the profile of said cavity being such as to cause the alternating rotation of said mass about said axis in either direction.

In a particular embodiment the pawl is pivoted on a lever having a cam-engaging pin, said lever being equipped with a rack engaged by a gear whose shaft is solid with the shaft of said rotatable body.

Said particular embodiment of the inventive device will be now described, by way of example and without limitation, reference being had to the accompanying drawing, wherein:

FIGURE 1 is a perspective view of the inventive device.

FIGURE 2 is a plot showing the trend in time of the fall-down of the pawl on the cam.

As seen in FIG. 1, the motion to a toothed wheel 6 is supplied by a pawl 5 pivoted at 17 to a lever 15 fulcrumed at 16 on a fixed pivot. One end of the lever 15 is equipped with a pin 3 engaged by a cam 1 rotatable in the direction shown by the arrow A and having a stepped portion 2. The pin 3 contacts the cam 1 due to the bias of a spring 4, and the pawl 5 is likewise kept into engagement with the teeth of the toothed wheel 6 by a spring 7.

The lever 15 has a rack 8 engaged by a gear 9 fitted with a shaft 18 integral with a rotatable body 10. Said rotatable body has a star-shaped cavity 11 in which a pin 12 is engaged, which is integral with a rotatable mass 13 equipped with a pivot 14.

In operation, the cam 1 is rotated in the direction of the arrow A, causing the displacement of the pin 3 and thus of the lever 15 in the direction of the arrow B. More particularly, starting from the position of FIG. 1, the cam is rotated and causes the downward displacement of the lever 15 and consequently the downward displacement of the pawl 5 which becomes clear of a tooth of the wheel 6 to engage the underlying tooth. When the step 2 comes in registry with the pin 3, the latter jumps and causes an abrupt upward displacement of the lever 15 and the pawl 5: the latter urges the tooth it engages and causes the rotation of the toothed wheel 6 in the direction shown by the arrow F.

The displacements of the lever 15 are transferred by the rack 8 to the gear 9 and, therefrom, to the rotatable body which is alternatingly rotated in either directions as shown by the arrow D. Said rotation is transferred to the mass 13 by the agency of the pin 12 engaged by the cavity 11. The mass 13 is alternatingly rotated or, better to speak, it swings in the two directions shown by the arrow E. Thus the reciprocal motion of the pin 3 is translated into a set of quick and short rotations in the two directions as indicated. Since the mass 13 is metallic and has a certain weight, it tends to take a frequency of oscillation of its own, which is constant in time and is just a function of its mass. This constancy of the oscillations is converted into a constancy of rotation of rotatable body 10 and the gear 9 and thus also into a constancy of fall-down of the pin 3. The dropping motion of the pawl on the teeth of the toothed gear has thus a constant speed and, in addition, said speed can be properly selected, even though within a comparatively narrow range, by appropriately selecting the constant of elasticity of the spring 4 and the frequency of oscillation of the mass 13.

What has been said in the foregoing is depicted in FIG. 2, reporting a comparison as a function of time of the drop of the pin on the cam in the case without damping and in the case with damping as examined here. The dropping space without adjustment is shown in dotted lines: as can be seen, this is a well known space-time plot of an accelerated motion, whereas the solid line shows the dropping space for the case in which an adjustment device is contemplated. Since in the latter case a constant-speed dropping motion is involved, spaces are a linear function of time and the times are thus comparatively longer. It should not be overlooked, for a correct interpretation of the plot, that the abscissa scale is enlarged considerably.

A characteristic of the present invention is a system for adjusting the dropping speed of a pawl on an advance toothed wheel, consisting of a mass which is driven to oscillation by said dropping motion. Since the frequency of oscillation is correlated to the snapping speed on the one hand, and to the proper frequency of the mass, it is apparent that the latter is enabled properly to condition the former.

What is claimed is:
1. A device for adjusting the dropping speed of a pawl for advancing a toothed wheel, preferably used for timing devices and the like, said pawl being cam-controlled, characterized in that means are provided to transfer the motion of the pawl to a rotatable body having a cavity in which a pin is engaged, said pin being integral with a mass rotatable about an axis, the profile of said cavity being such as to cause the rotation of said mass about said axis in either direction alternatingly.

2. A device according to claim 1, characterized in that said pin is pivoted on a lever having a pin which engages said cam, said lever having a rack engaging a gear whose shaft is integral with the shaft of said rotatable body.

References Cited
UNITED STATES PATENTS

| | | | |
|---|---|---|---|
| 2,578,632 | 12/1951 | Miller | 74—54 |
| 3,141,432 | 7/1964 | Reeber et al. | 74—54 |
| 3,200,655 | 8/1965 | Tringali | 74—54 |

FRED C. MATTERN, JR., Primary Examiner

WESLEY S. RATLIFF, JR., Assistant Examiner

U.S. Cl. X.R.
74—54